(12) United States Patent
Kumar et al.

(10) Patent No.: US 8,538,626 B2
(45) Date of Patent: Sep. 17, 2013

(54) SYSTEMS AND METHODS FOR DIAGNOSING AN ENGINE

(75) Inventors: Ajith Kumar, Erie, PA (US); Somakumar Ramachandrapanicker, Bangalore (IN); Paul Flynn, Erie, PA (US); Arijit Banerjee, Kolkata (IN); Rupam Mukherjee, Bangalore (IN)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 13/234,411

(22) Filed: Sep. 16, 2011

(65) Prior Publication Data
US 2013/0073127 A1 Mar. 21, 2013

Related U.S. Application Data

(60) Provisional application No. 61/535,049, filed on Sep. 15, 2011.

(51) Int. Cl.
*G01M 15/00* (2006.01)

(52) U.S. Cl.
USPC . 701/33.7; 701/34.4; 73/114.11; 123/406.26; 123/406.27

(58) Field of Classification Search
USPC .............. 701/22, 29.1, 29.4, 29.5, 29.6, 30.2, 701/30.5, 30.6, 30.7, 34.3, 34.4, 32.9, 33.7, 701/99, 101, 114; 318/400.12, 254, 138, 318/430, 432; 73/114.58, 114.62, 114.61, 73/114.77, 114.02, 114.04, 114.11, 114.15, 73/114.23, 114.59; 123/406.26, 679, 687, 123/406.41, 406.42, 406.43, 406.24, 406.27, 123/435
See application file for complete search history.

(56) References Cited

U.S. PATENT DOCUMENTS

| 4,334,427 | A | 6/1982 | Armstrong |
| 5,056,487 | A | 10/1991 | Yamakado et al. |
| 5,216,915 | A | 6/1993 | Sakamoto |
| 5,461,289 | A | 10/1995 | Adler et al. |
| 5,711,272 | A | 1/1998 | Maegawa et al. |
| 5,728,941 | A | 3/1998 | Yamamoto et al. |
| 5,860,800 | A | 1/1999 | Kramer et al. |
| 6,023,651 | A | 2/2000 | Nakayama et al. |
| 6,490,511 | B1 | 12/2002 | Raftari et al. |

(Continued)

FOREIGN PATENT DOCUMENTS

| EP | 0522849 A1 | 7/1991 |
| EP | 1143134 A1 | 10/2001 |
| JP | 2004251178 A | 9/2004 |

OTHER PUBLICATIONS

U.S. Appl. No. 13/047,200, filed Mar. 14, 2011.

(Continued)

*Primary Examiner* — Mary Cheung
*Assistant Examiner* — Rodney Butler
(74) *Attorney, Agent, or Firm* — GE Global Patent Operation; John A. Kramer

(57) ABSTRACT

Methods and systems are provided for an engine. A condition of the engine may be diagnosed based on a combustion torque profile of the engine estimated using signals from a generator operationally connected to the engine and/or other signals associated with the engine. Different types of degradation may be distinguished based on discerning characteristics within the estimated combustion torque profile data. Thus, a degraded engine component may be identified in a manner that reduces service induced delay.

10 Claims, 8 Drawing Sheets

(56) References Cited

U.S. PATENT DOCUMENTS

| | | |
|---|---|---|
| 6,510,731 B2 | 1/2003 | Schricker et al. |
| 6,658,346 B2 | 12/2003 | Maegawa |
| 6,968,268 B2 | 11/2005 | Yamada et al. |
| 7,133,766 B2 | 11/2006 | Kokubo |
| 7,197,916 B2 | 4/2007 | Matsumoto et al. |
| 7,761,223 B2 | 7/2010 | Wang et al. |
| 2002/0050271 A1 | 5/2002 | Hasegawa et al. |
| 2004/0148926 A1 | 8/2004 | Morinaga et al. |
| 2005/0204805 A1 | 9/2005 | Wakahara et al. |
| 2009/0025992 A1* | 1/2009 | Hayashi et al. .......... 180/65.265 |
| 2009/0120174 A1 | 5/2009 | Nodera et al. |
| 2009/0229355 A1 | 9/2009 | Shoda |
| 2010/0066097 A1* | 3/2010 | Verdejo et al. .............. 290/40 A |
| 2010/0131172 A1* | 5/2010 | Willi et al. ..................... 701/103 |
| 2010/0162797 A1 | 7/2010 | Summers et al. |
| 2010/0211296 A1 | 8/2010 | Saunders |
| 2011/0153128 A1* | 6/2011 | Wright et al. ................... 701/22 |

OTHER PUBLICATIONS

Search Report and Written Opinion from corresponding PCT Application No. PCT/US2012/053499 dated Jan. 23, 2013.

\* cited by examiner

SYSTEMS AND METHODS FOR DIAGNOSING AN ENGINE

This application claims the benefit of U.S. provisional patent application Ser. No. 61/535,049, filed on Sep. 15, 2011, which is hereby incorporated by reference in its entirety.

FIELD

Embodiments of the subject matter disclosed herein relate to systems and a methods for diagnosing an engine.

BACKGROUND

Engine components may degrade during operation in various ways. For example, an engine cylinder in an engine may start mis-firing due to a worn out ignition plug. One approach to detect engine degradation is to monitor engine speed. Diagnostic routines can monitor whether components of the engine speed rise above a threshold level, and generate diagnostic codes or other indications requesting service, de-rating engine power, or shutting down the engine. However, the inventors herein have recognized that analysis of engine speed is often inadequate to thoroughly diagnose an engine problem.

BRIEF DESCRIPTION

In one embodiment, a method for a reciprocating engine operationally connected to a generator is disclosed. The method includes diagnosing a condition of the engine by comparing an estimated combustion torque profile of the engine to an expected engine torque profile.

In one embodiment, a method for a reciprocating engine operationally connected to a generator is disclosed. The method includes diagnosing an in-cylinder pressure profile of the engine by comparing an estimated combustion torque profile of the engine to an expected engine torque profile.

In one embodiment, a vehicle system is disclosed. The vehicle system includes an engine, a generator operatively connected to the engine, at least one sensor for measuring at least one electrical parameter associated with the generator during operation, a sensor for measuring the speed of a rotating shaft of the engine, and a controller. The controller includes instructions configured to sample and transform the at least one electrical parameter to an electromagnetic torque profile, sample and transform the rotating shaft speed to an inertial torque profile, and estimate a combustion torque profile of the engine form the electromagnetic torque profile and the inertial torque profile.

In one embodiment, a test kit is provided. The test kit includes a controller that is operable to determine a condition of a reciprocating engine operationally coupled to a generator based on comparing an estimated combustion torque profile of the engine to an expected engine torque profile.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The invention will be understood from reading the following description of non-limiting embodiments, with reference to the attached drawings, wherein below.

DETAILED DESCRIPTION

Embodiments of the subject matter disclosed herein relate to systems and a methods for diagnosing an engine. Test kits for performing the methods are provided, also. The engine may be included in a vehicle, such as a locomotive system. Other suitable types of vehicles may include on-highway vehicles, off-highway vehicles, mining equipment, aircraft, and marine vessels. Other embodiments of the invention may be used for stationary engines such as wind turbines or power generators. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition. These vehicles may include an engine with components that degrade with use.

Furthermore, embodiments of the subject matter disclosed herein use generator data, such as measured generator electrical parameters or generator data (e.g., a derived torque profile) derived from measured generator electrical parameters and/or engine parameters (e.g., speed), to diagnose conditions of an engine and to distinguish between conditions and associated engine components.

An engine may be put in a particular operating condition or mode when looking for particular types of engine degradation. For example, the engine may be diagnosed during a self-loaded condition as part of a test procedure, a dynamic brake (db) setup condition, or a steady state motoring condition. The diagnostic and prognostic methods discussed herein can be used for trending, comparing cylinder-to-cylinder variation, performing test procedures, repair confirmation, and aid in repair. Alternatively, generator and/or engine data may be sampled and analyzed when the engine reaches a particular operating condition or state during normal operation.

Figure 1:
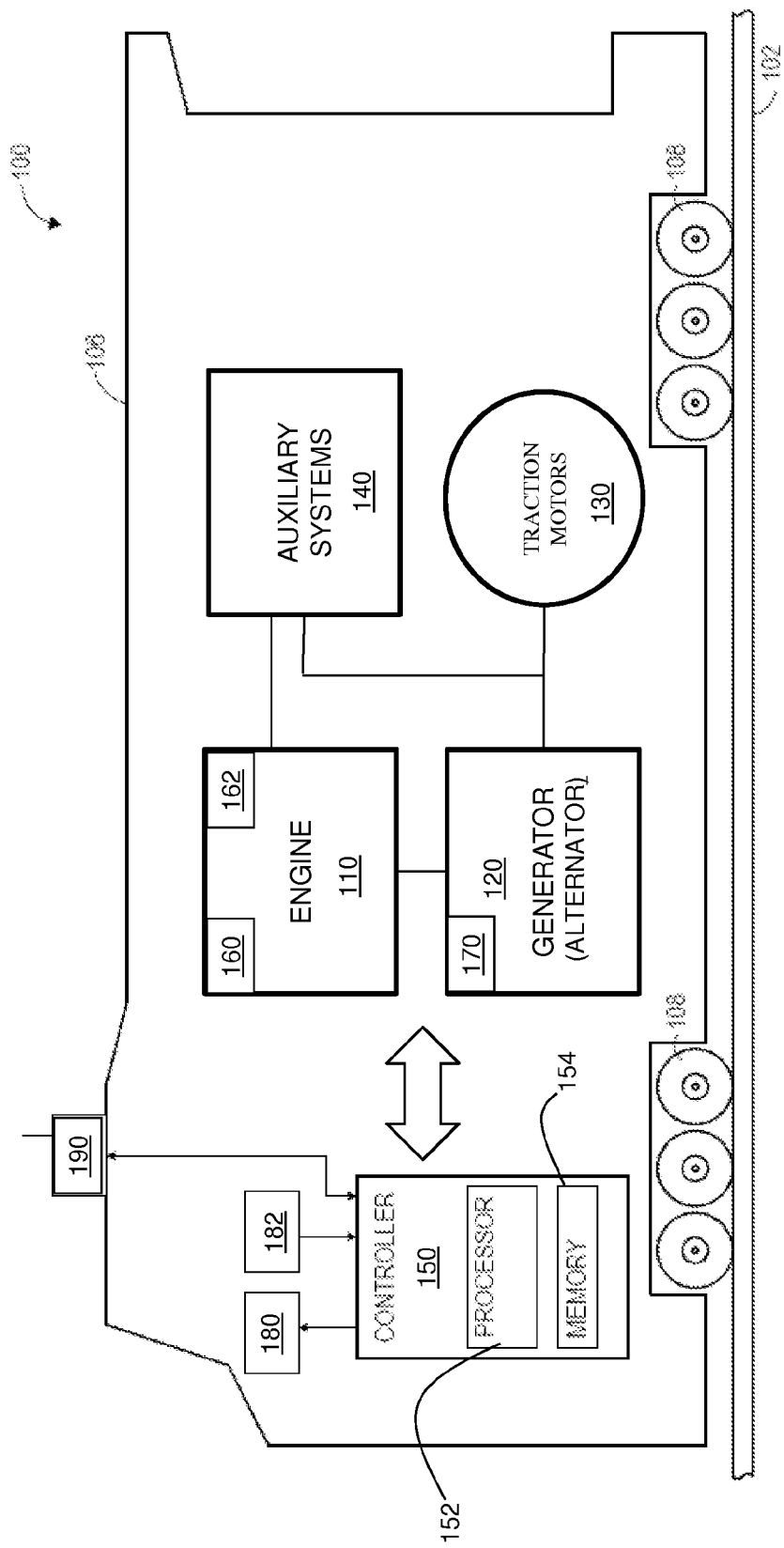
FIG. 1 is an illustration of an example embodiment of a vehicle system (e.g., a locomotive system), having an engine and a generator (alternator), herein depicted as a rail vehicle configured to run on a rail via a plurality of wheels.

FIG. 1 is an illustration of an example embodiment of a vehicle system 100 (e.g., a locomotive system) herein depicted as a rail vehicle 106 configured to run on a rail 102 via a plurality of wheels 108. As depicted, the rail vehicle 106 includes an engine 110 operatively connected to a generator (alternator) 120. The vehicle 106 also includes traction motors 130 operatively connected to the generator 120 for driving the wheels 108. The vehicle 106 further includes various auxiliary systems or equipment 140 operatively connected to the generator 120 or the engine 110 (e.g., the rotatable engine shaft 111, see FIG. 2) for performing various functions.

The vehicle 106 further includes a controller 150 to control various components related to the vehicle system 100. In one example, controller 150 includes a computer control system. In one embodiment, the computer control system is largely software based and includes a processor, such as processor 152, configured to execute computer operable instructions. The controller 150 may include multiple engine control units (ECU) and the control system may be distributed among each of the ECUs. The controller 150 further includes computer readable storage media, such as memory 154, including instructions (e.g., computer executable instructions) for enabling on-board monitoring and control of rail vehicle operation. Memory 154 may include volatile and non-volatile memory storage. In accordance with another embodiment, the controller may be hardware based using, for example, digital signal processors (DSPs) or other hardware logic circuitry to perform the various functions described herein.

The controller may oversee control and management of the vehicle system 100. The controller may receive a signal from a speed sensor 160 of the engine or from various generator sensors 170 to determine operating parameters and operating conditions, and correspondingly adjust various engine actuators 162 to control operation of the rail vehicle 106. In accordance with an embodiment, the speed sensor includes a multi-tooth pick-up wheel connected to the engine shaft 111, and a reluctance sensor for sensing when a tooth of the pick-up wheel passes by the reluctance sensor. For example, the controller may receive signals representing various generator parameters from various generator sensors. The generator parameters can include a dc-link voltage, a dc-link current, a generator field voltage, a generator field current, a generator output voltage, and a generator output current. Other generator parameters may be possible as well, in accordance with various embodiments. Correspondingly, the controller may control the vehicle system by sending commands to various components such as traction motors, alternator, cylinder valves, throttle, etc. Signals from generator sensors 170 may be bundled together into one or more wiring harnesses to reduce space in vehicle system 100 devoted to wiring and to protect the signal wires from abrasion and vibration.

The controller may include onboard electronic diagnostics for recording operational characteristics of the engine. Operational characteristics may include measurements from sensors 160 and 170, for example. In one embodiment, the operational characteristics may be stored in a database in memory 154. In one embodiment, current operational characteristics may be compared to past operational characteristics to determine trends of engine performance.

The controller may include onboard electronic diagnostics for identifying and recording potential degradation and failures of components of vehicle system 100. For example, when a potentially degraded component is identified, a diagnostic code may be stored in memory 154. In one embodiment, a unique diagnostic code may correspond to each type of degradation that may be identified by the controller. For example, a first diagnostic code may indicate a problem with cylinder 1 of the engine and a second diagnostic code may indicate a problem with cylinder 2 of the engine, etc.

The controller may be further linked to display 180, such as a diagnostic interface display, providing a user interface to the locomotive operating crew and a maintenance crew. The controller may control the engine, in response to operator input via user input controls 182, by sending a command to correspondingly adjust various engine actuators 162. Non-limiting examples of user input controls 182 may include a throttle control, a braking control, a keyboard, and a power switch. Further, operational characteristics of the engine, such as diagnostic codes corresponding to degraded components, may be reported via display 180 to the operator and/or the maintenance crew.

The vehicle system may include a communications system 190 linked to the controller. In one embodiment, communications system 190 may include a radio and an antenna for transmitting and receiving voice and data messages. For example, data communications may be between vehicle system and a control center of a railroad, another locomotive, a satellite, and/or a wayside device, such as a railroad switch. For example, the controller may estimate geographic coordinates of vehicle system using signals from a GPS receiver. As another example, the controller may transmit operational characteristics of the engine to the control center via a message transmitted from communications system 190. In one embodiment, a message may be transmitted to the command center by communications system 190 when a degraded component of the engine is detected and the vehicle system may be scheduled for maintenance.

Figure 2:
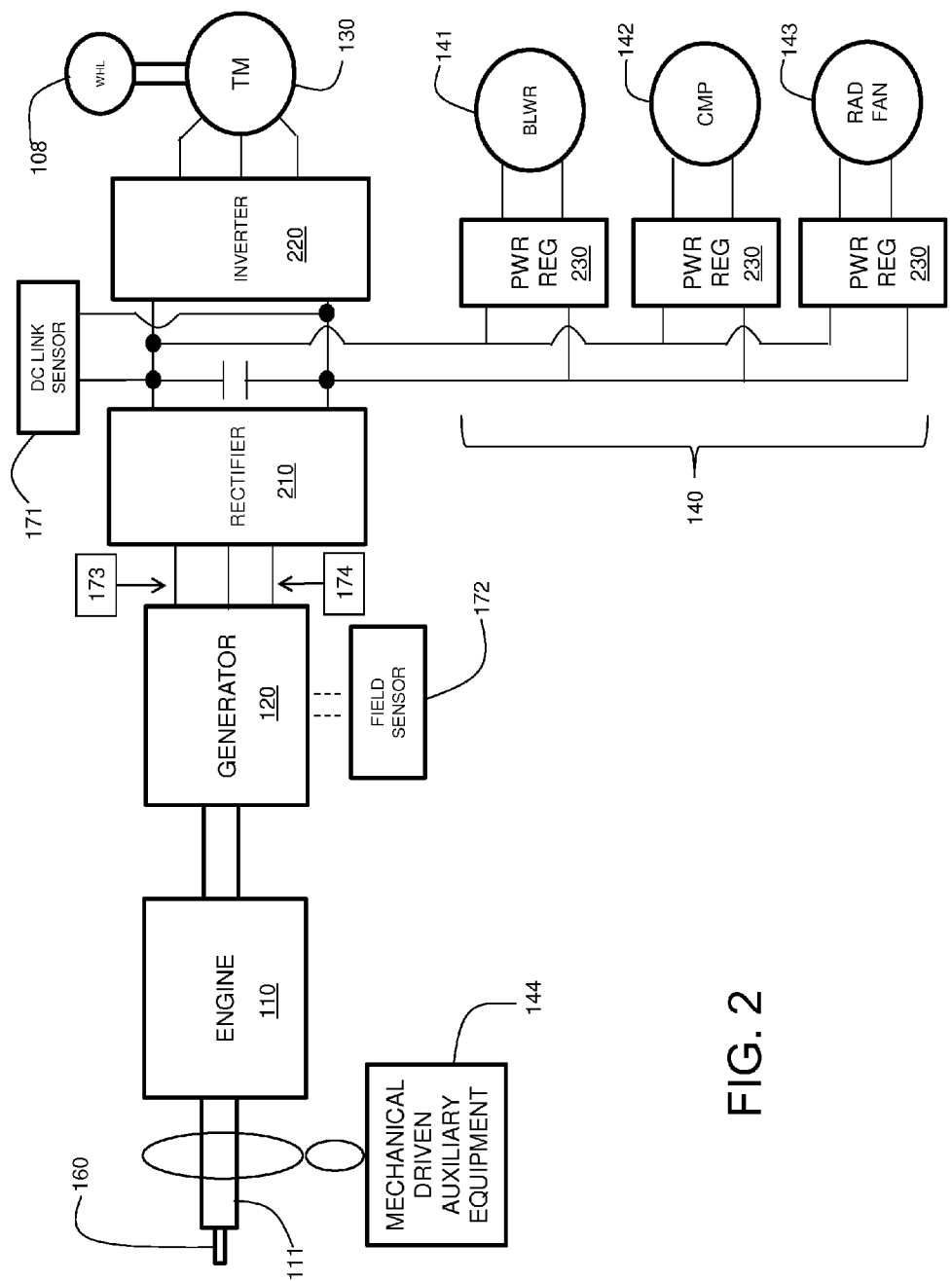
FIG. 2 is an illustration of an example embodiment of the engine and generator of FIG. 1 operatively connected to various auxiliary equipment and traction motors.

FIG. 2 is an illustration of an example embodiment of the engine 110 and generator 120 of FIG. 1 operatively connected to various auxiliary equipment 140 (141, 142, 143, 144) and traction motors 130. Various mechanical auxiliary equipment 144 may be operatively coupled to and driven by the rotating engine shaft 111. Other auxiliary equipment 140 are driven by the generator 120 through a rectifier 210 that produces a dc-link voltage to power regulators 230. Examples of such auxiliary equipment include a blower 141, a compressor 142, and a radiator fan 143. The traction motors 130 are driven by the generator 120 through the rectifier 210 that produces a dc-link voltage to an inverter 220. Such auxiliary equipment 140, traction motors 130, and their implementations are well known in the art. In accordance with certain embodiments, the generator 120 may actually be one or more generators such as, for example, a main generator to drive the traction motors 130 and an auxiliary generator to drive a portion of the auxiliary equipment 140. Further examples of auxiliary equipment include turbochargers, pumps, and engine cooling systems.

The speed sensor 160 measures the speed of the rotating shaft 111 of the engine during operation. The dc-link sensor 171 is a generator sensor and can measure dc-link voltage, dc-link current, or both, in accordance with various embodiments. The field sensor 172 is a generator sensor and can measure field current of the generator, field voltage of the generator, or both, in accordance with various embodiments. In accordance with certain embodiments, generator sensors 173 and 174 are provided for measuring the armature output voltage and current of the generator, respectively. Suitable commercially available sensors may be selected based on application specific parameters.

In accordance with various embodiments, the controller 150 is operable to report a degraded engine condition, for example, via the communication system 190. Furthermore, in accordance with various embodiments, the controller includes instructions configured to adjust an engine operating parameter based on the diagnosed condition.

Figure 3:
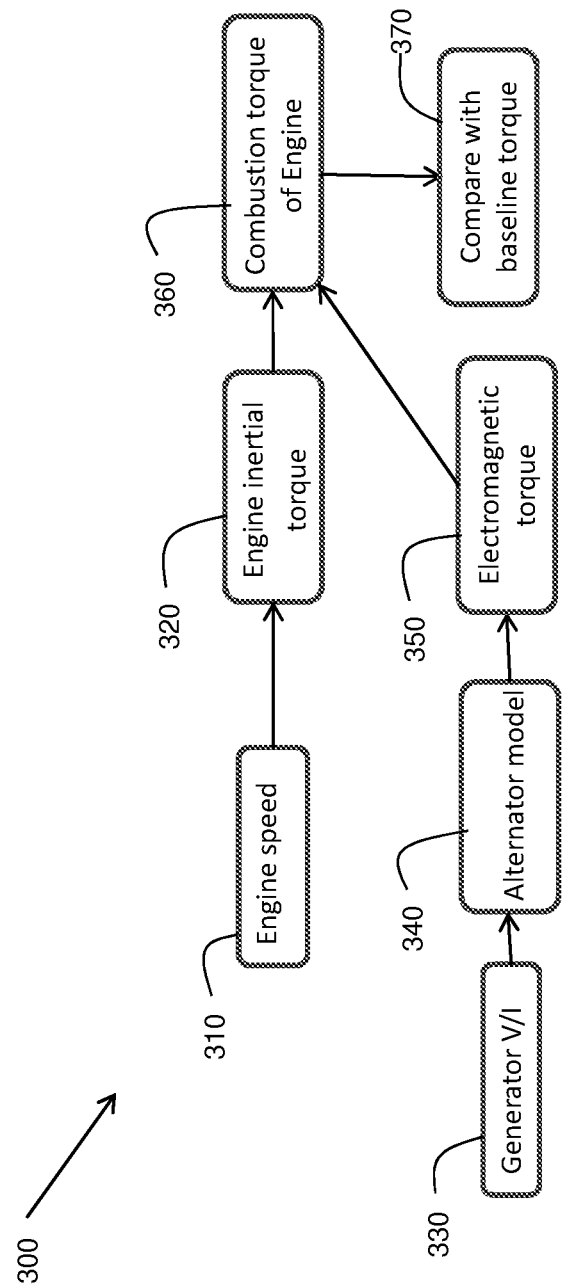
FIG. 3 is an illustration of an example embodiment of how to estimate an engine combustion torque profile from engine speed and generator electrical parameters.

FIG. 3 is an illustration of an example embodiment of a method 300 to estimate a combustion torque profile of an engine from engine speed and generator electrical parameters. In step 310, the engine speed signal is sampled by the controller 150 (e.g., via the speed sensor 160). In step 320, the inertial torque profile of the engine is estimated from the engine speed. In step 330, a current and/or a voltage of the generator are sampled by the controller 150 (e.g., via the generator sensors 170). In step 340, the sampled current and/or voltage are passed through an alternator model. In step 350, an electromagnetic torque profile of the generator is estimated from output of the alternator model. In step 360, the inertial torque profile is modified by the electromagnetic torque profile to produce a combustion torque profile of the engine. In step 370, the combustion torque profile is compared to a baseline or expected engine torque profile.

Figure 4:
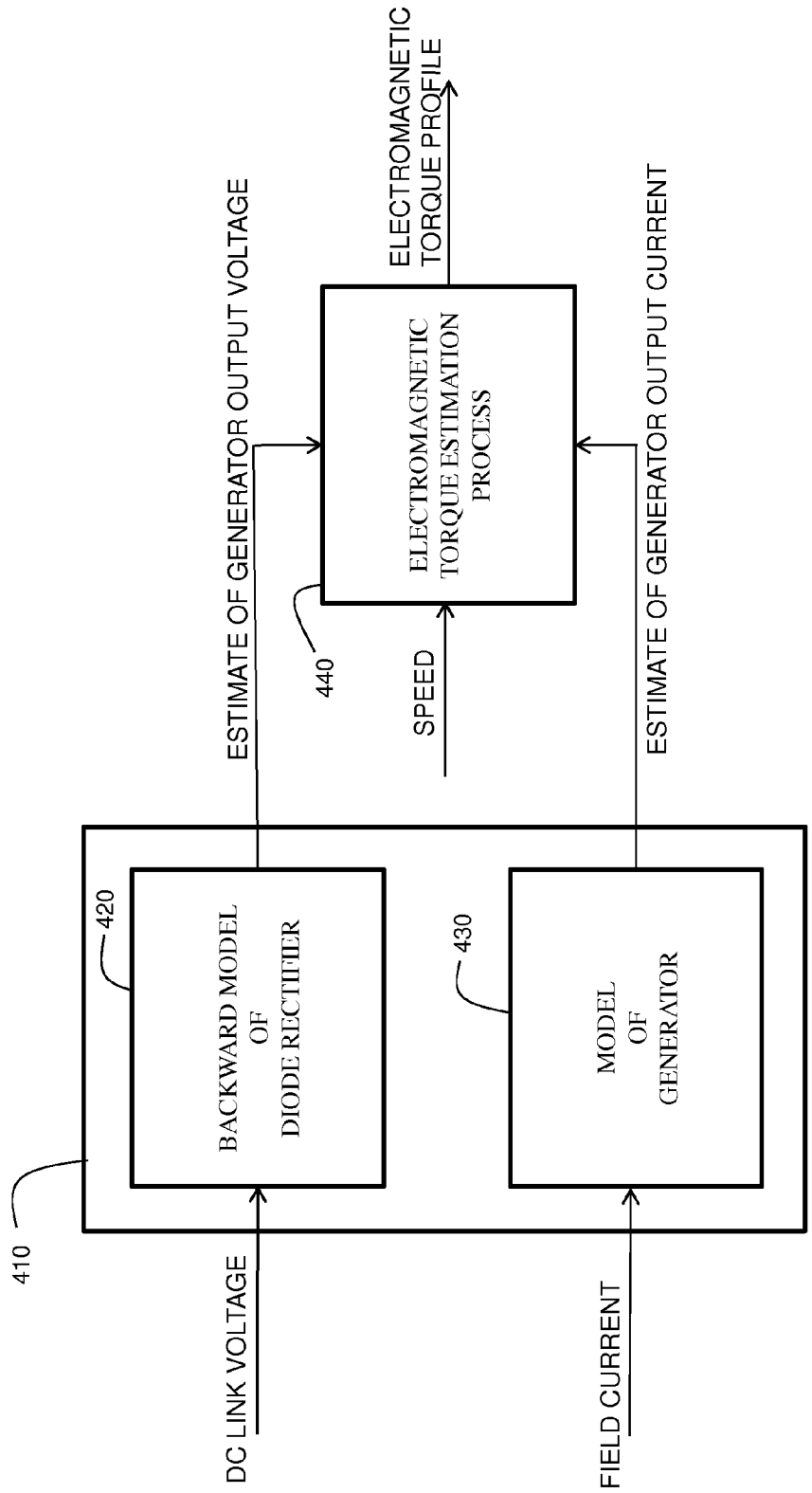
FIG. 4 is an illustration of an example embodiment of how to convert generator electrical parameters to an electromagnetic torque profile.

FIG. 4 is an illustration of an example embodiment of how to convert generator electrical parameters to an electromagnetic torque profile. A dc-link voltage and a generator field current (e.g., as measured by generator sensors 171 and 172) are fed into an alternator model 410, implemented in the controller 150, which includes a backward model 420 of a rectifier 210 and a model 430 of a generator 120. The rectifier can be a diode rectifier, a phase-controlled rectifier, or a pulse width modulation (PWM) rectifier, in accordance with various embodiments. In accordance with an alternative embodiment, instead of having a rectifier, an ac load may be directly connected, or indirectly connected through controlled power electronics devices, and backward modeled.

The backward model 420 estimates the generator output voltage from the dc-link voltage. Similarly, the generator model 430 estimates the generator output current form the field current. The generator output current and voltage are fed into an electromagnetic torque estimation process 440 implemented in the controller 150. The electromagnetic torque estimation process 440 uses the generator output voltage and current, along with an indication of the speed of the engine, to estimate an electromagnetic torque profile. An indication of the speed of the engine is used to tell the torque estimation model 440 where the harmonic frequencies of interest are located. Engine speed from the speed sensor 160 may be used as an input, or frequency content (e.g., the sixth harmonic) out of the rectifier 210 (e.g., frequency content of the dc-link voltage signal) can be used as an indication of speed of the engine.

As a result, an electromagnetic torque profile associated with the generator can be derived from the dc-link voltage and the generator field current. Alternatively, the dc-link current and the generator field voltage could be used with corresponding models to estimate generator output current from the dc-link current and generator output voltage from the generator field voltage. If the generator output voltage and current are already available to the controller 150 (due to such sensors being on the generator), then the backward model 420 and the generator model 430 may be bypassed. Furthermore, if a less accurate estimation of the torque profile is acceptable, just one of the parameters (dc-link voltage, dc-link current, generator field current, generator field voltage, output generator current, output generator voltage) can be used to estimate a torque profile instead of both.

Figure 5:
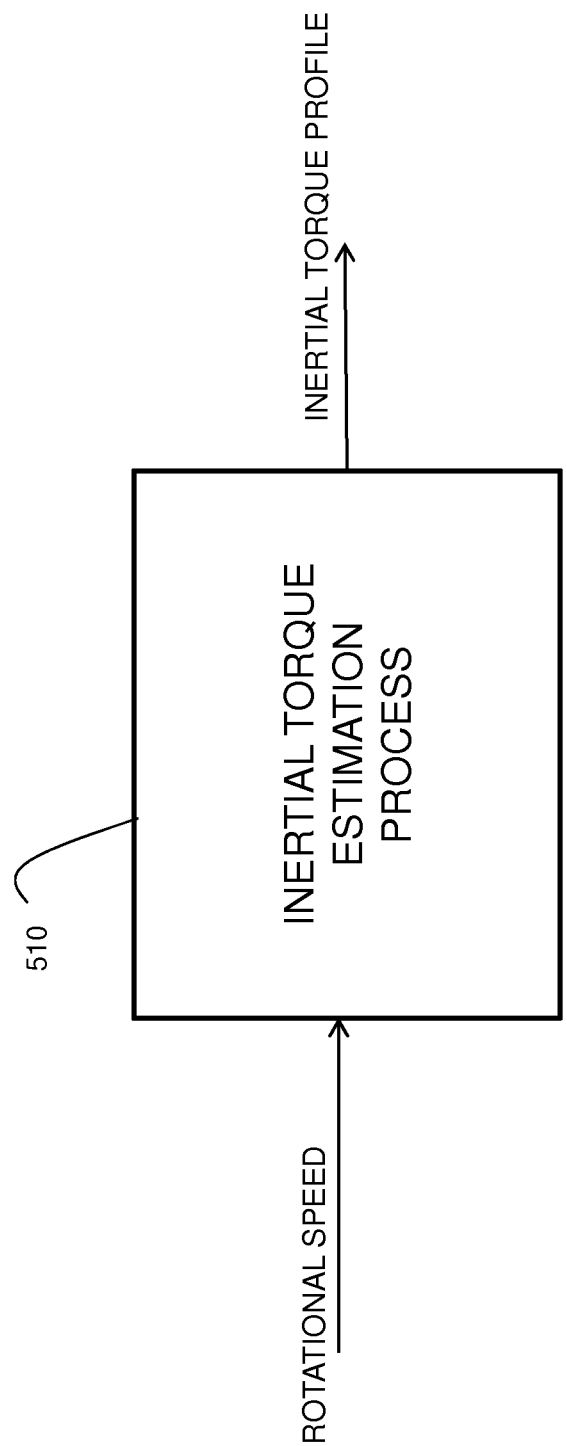
FIG. 5 is an illustration of an example embodiment of how to generate an inertial torque profile from the rotational speed of the engine.

In an embodiment, the controller implements an inertial torque estimation process. FIG. 5 is an illustration of an example embodiment of how to generate an inertial torque profile from the rotational speed of the engine using an inertial torque profile estimation process 510 of the controller 150. The engine inertial torque profile may be estimated from the engine speed by sampling measured rotational speed of the engine (e.g., from the speed sensor 160) over time, deriving acceleration components (considering the derivative of speed with respect to time) from the measured rotational speed at determined characteristic frequencies, and combining the acceleration components to determine the inertial torque profile.

Figure 6:
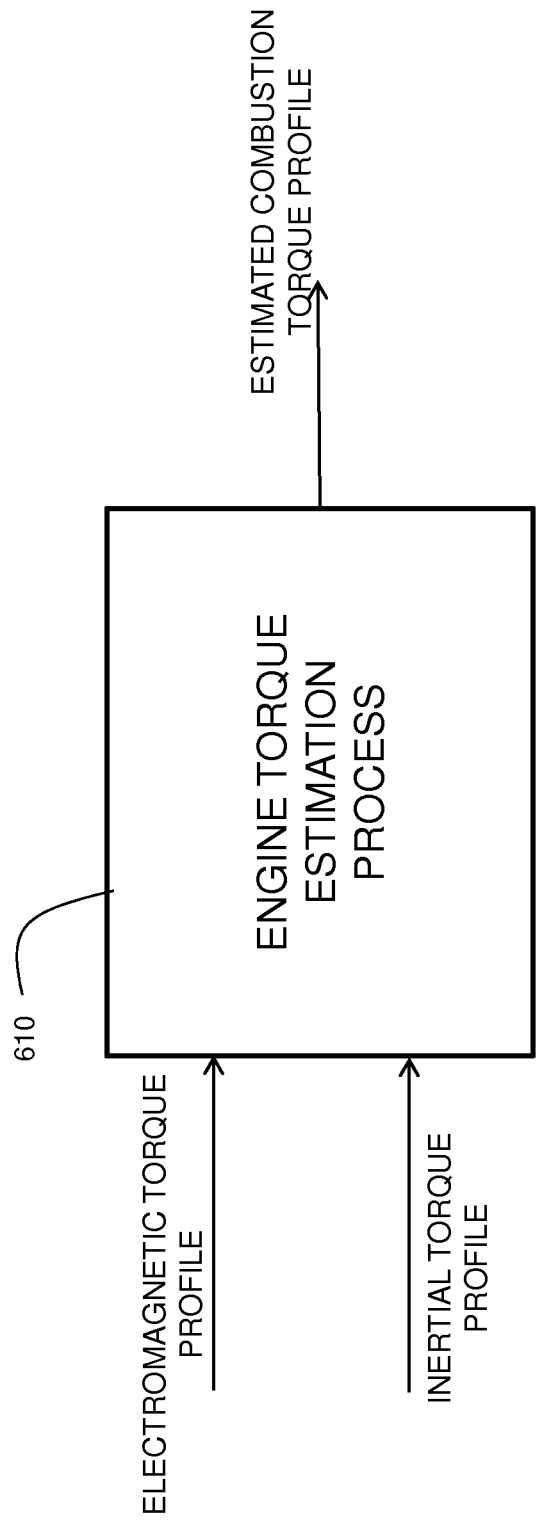
FIG. 6 is an illustration of an example embodiment of how the engine combustion torque profile is estimated.
Figure 7:
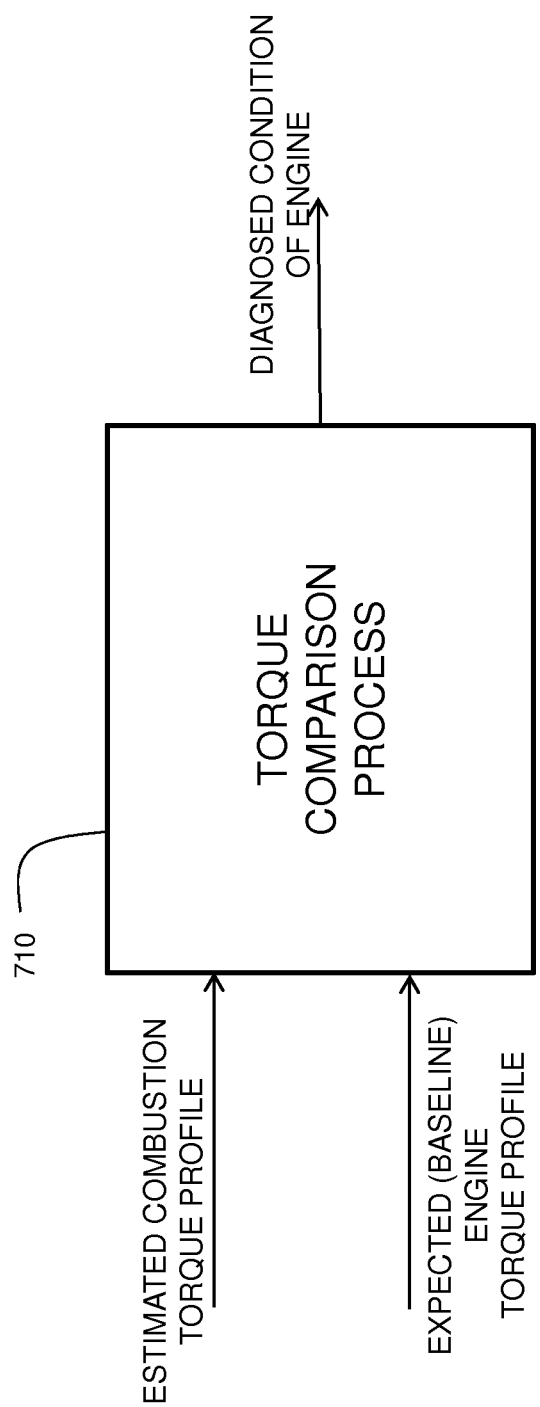
FIG. 7 is an illustration of an example embodiment of how a torque comparison process is used to diagnose a condition of an engine.

FIG. 6 is an illustration of an example embodiment of how the combustion torque profile of the engine is estimated. The controller 150 implements an engine torque estimation process 610 which compensates the electromagnetic torque profile of the generator with the inertial torque profile of the engine with the given speed fluctuations to yield an accurate combustion torque profile at the engine end. As shown in FIG. 7, the controller 150 implements a torque profile comparison process 710 to compare the estimated combustion torque profile of the engine with an expected or baseline torque profile. In one embodiment, a template matching or signature matching algorithm is employed to perform the comparison. A particular deviation from the baseline torque profile can correspond to a particular degradation of an engine component (e.g., to which power assembly component of the engine has failed). In accordance with an embodiment, the estimated combustion torque profile is indicative of an in-cylinder pressure profile of the engine. Therefore, the method 300 allows for accurate prediction of in-cylinder pressure profiles of engines using existing engine and generator sensors.

In accordance with an embodiment, the reciprocating engine can first be driven to a specified operating condition, state, or mode before performing the combustion torque estimation process 300. In accordance with another embodiment, the combustion torque estimation process 300 is not performed until the engine reaches a determined operating condition, state, or mode during normal operation, where the controller is triggered to perform the torque estimation process and subsequent comparison of the estimated torque profile to the baseline torque profile.

In accordance with various embodiments, the controller 150 is operable to report a degraded engine condition, for example, via the communication system 190. Furthermore, in accordance with various embodiments, the controller includes instructions configured to adjust an engine operating parameter based on the diagnosed condition.

A test kit can be provided which includes a controller that is operable to determine a condition of a reciprocating engine operationally coupled to a generator based on comparing an estimated combustion torque profile of an engine to and expected engine torque profile. The kit can also include at least one sensor to sense at least one electromagnetic parameter (e.g., dc-link voltage and/or generator field current) associated with the generator. The controller is operable to communicate with the sensors and to sample the electromagnetic parameter over time. The controller is also operable to estimate an electromagnetic torque profile from the electromagnetic parameters. The kit can further include a sensor to sense a rotating shaft speed of the reciprocating engine. The controller is operable to communicate with the sensor to sample the shaft speed over time. The controller is further operable to estimate an inertial torque profile form the shaft speed. The controller is also operable to determine the estimated combustion torque profile of the engine from the electromagnetic torque profile and the inertial torque profile.

Further examples of applications of systems and methods described herein are now provided. The examples illustrate various approaches for diagnosing and distinguishing between different types of engine degradation based on an estimated combustion torque profile of an engine as estimated from generator parameters and the rotational speed of the engine.

The engine may have a plurality of cylinders that fire in a predefined sequence, where each cylinder fires once during a four stroke or a two stroke cycle. For example, a four cylinder, four stroke engine may have a firing sequence of 1-3-4-2, where each cylinder fires once for every two revolutions of the engine. Thus, the firing frequency of a given cylinder is one half the frequency of revolution of the engine and the firing frequency of any cylinder is twice the frequency of revolution of the engine. The frequency of revolution of the engine may be described as the first engine order. Such a first order frequency component can show up in the frequency content of the measured generator parameter. The firing frequency of a given cylinder of a four stroke engine may be described as the half engine order, where the half engine order is one half the frequency of revolution of the engine. Such a half order frequency component can also show up in the frequency content of the measured generator parameter.

As another example of a four stroke engine, a twelve cylinder engine may have a firing sequence of 1-7-5-11-3-9-6-12-2-8-4-10, where each cylinder fires once for every two revolutions of the engine. Thus, the firing frequency of a given cylinder is one half the frequency of revolution of the engine and the firing frequency of any cylinder is six times the frequency of revolution of the engine. As an example of a two stroke engine, a twelve cylinder engine may have a firing sequence of 1-7-5-11-3-9-6-12-2-8-4-10, where each cylinder fires once for every revolution of the engine. Thus, the firing frequency of a given cylinder is the frequency of revolution of the engine and the firing frequency of any cylinder is twelve times the frequency of revolution of the engine. Again, these frequency components can show up in the frequency content of the measured generator parameter.

For example, the engine may be a four stroke engine operating at 1050 RPM. Thus, the first engine order is at 17.5 Hz and the half engine order is at 8.75 Hz. The dc-link voltage may vary with a periodic frequency as the engine shaft 111 rotates during operation. For example, the frequency content of the dc-link voltage may include a frequency component at the frequency of the first engine order. In other words, the peak magnitude of the frequency content may occur at the first-order frequency component. The dc-link voltage may also include frequency content at other harmonics of the first-order frequency, such as at a second-order frequency (twice the engine frequency), a third-order frequency (three times the engine frequency), etc. Similarly, the dc-link voltage may include frequency content at frequencies less than the first-order frequency, such as at a half-order frequency (half the engine frequency).

In one embodiment, a degraded cylinder of a four stroke engine may be detected based on a comparison of an estimated combustion torque profile of the engine to an expected or baseline torque profile of the engine. Detection of one degraded cylinder, where the other cylinders of the engine are more healthy (or less degraded), may have a better matching torque profile than when multiple cylinders of the engine are degraded. For example, one degraded cylinder may be identified by comparing one portion of the estimated combustion torque profile to that same portion of a baseline torque profile. However, multiple degraded cylinders may cause deviations in multiple portions of the combustion torque profile. Further, the position in the firing order of multiple degraded cylinders may change the portions of the estimated combustion torque profile which deviate from the baseline torque profile. For example, two degraded cylinders 180° out of phase may affect different portions of the torque profile than two degraded cylinders in successive firing order, and thus the methods disclosed herein may identify one or more degraded cylinders based on various changes in the estimated torque profile. Anomalies not matching the baseline torque profile of a healthy engine or a different degraded engine component may be identified and reported by the controller, for example. Other examples of degraded engine components include a degraded crankcase evacuation system, a degraded turbocharger, and a degraded crankcase.

In one embodiment, the time-domain generator data (e.g., dc-link voltage and field current) may be filtered by a low-pass filter with a cut-off frequency slightly greater than a first-order frequency of the engine. For example, the cut-off frequency may be ten to twenty percent greater than the first-order frequency. Thus, in one embodiment, the cut-off frequency may be determined by the engine speed. The generator data may be sampled in time at a frequency greater than or equal to the Nyquist rate. In one embodiment, the time-domain signal may be sampled at a frequency greater than twice the first engine order frequency. In one embodiment, the time-domain signal may be sampled at a frequency greater than twice the engine red-line frequency. Thus, by low-pass filtering and sampling at a frequency greater than or equal to the Nyquist rate, the frequency content of the generator data may not be aliased. The same may apply for speed data of the engine.

Figure 8:
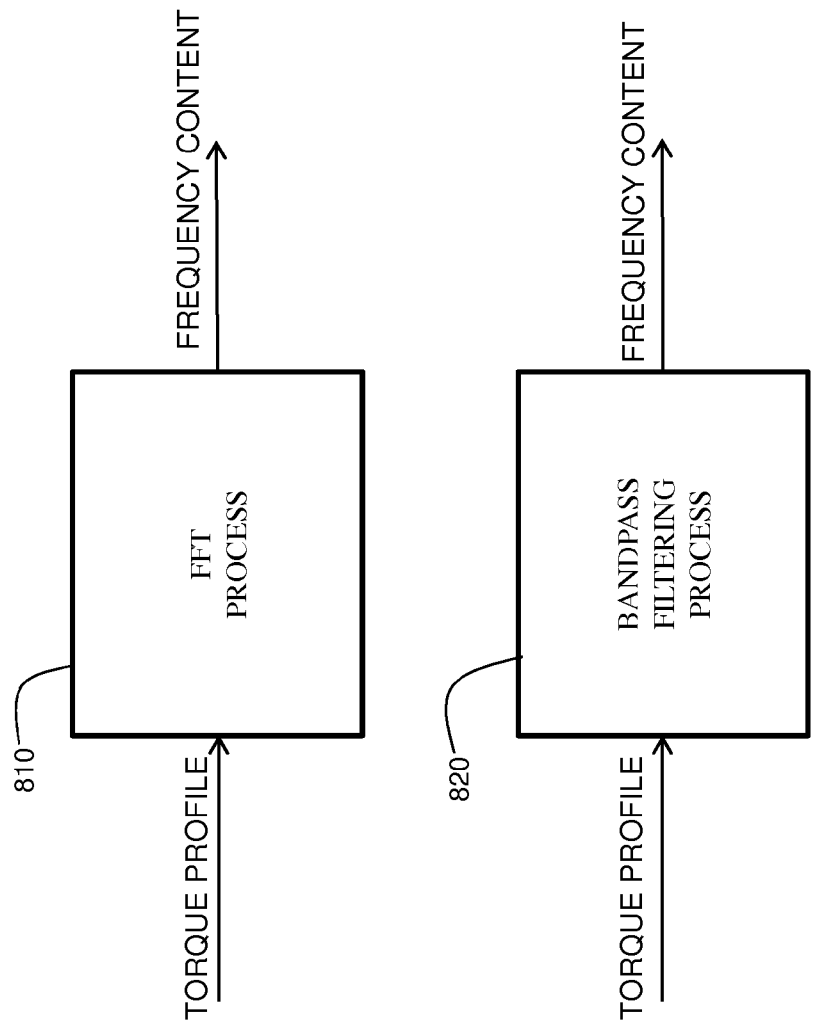
FIG. 8 is an illustration of example embodiments of how to generate frequency content of a time domain torque profile which may be used for engine diagnosis.

FIG. 8 is an illustration of example embodiments of how to generate frequency content of a time domain torque profile which may be used for engine diagnosis. The estimated combustion torque profile of the engine (time domain data) may be input to a Fourier transform process 810 (e.g., a Fast Fourier Transform, FFT, process) or a bandpass filtering process 820 to extract the frequency domain content of the estimated combustion torque profile of the engine. Furthermore, generator signals (e.g., dc-link voltage) and the engine speed signal may be processed to extract frequency content in a similar manner.

As discussed herein, the sampled generator data (e.g., dc-link voltage, torque, etc.) may be transformed to generate a frequency domain frequency content. In one embodiment, a Fast Fourier Transform (FFT) may be used to generate the frequency domain frequency content. In another embodiment, a bandpass filtering process may be used to generate the frequency domain content. The frequency analysis process transforms the sampled time domain parameter into frequency content in the frequency domain. The various frequency components of the frequency content can include dc (zero order), fundamental (first order) and harmonic (second order, half order, third order, etc.) frequency components. In accordance with an embodiment, the Fourier Transform process and the bandpass filter process include computer executable instructions that are executed by the processor 152.

In one embodiment, a correlation algorithm may be applied to compare the frequency content of the generator data, to a signature for a condition of the engine. For example, the signature for a healthy engine may include frequency content at the first-order frequency with a magnitude below a first-order threshold value and frequency content at the half-order frequency with a magnitude below a half-order threshold value. The first-order threshold value may correspond to engine speed, engine load, crankcase temperature, and historical engine data. Furthermore, the threshold level T can be dependent on an operating condition of the engine such as, for example, power, speed, ambient conditions, repair history, etc.

For example, the historical engine and generator data may be stored in a database including samples of frequency content from earlier operation of the engine. Thus, a trend in frequency content may be detected and the trend may be used to determine the health of the engine. For example, an increasing magnitude at the half engine order component for a given engine speed and load may indicate that a cylinder is degrading. As another example, an increasing average crankcase pressure coupled without an increasing magnitude at the half engine order component for a given engine speed and load may indicate that the turbocharger or crankcase evacuation system is degrading. A potential fault may include a degraded cylinder, a degraded turbocharger, or a degraded crankcase evacuation system.

In one embodiment, frequency content of the combustion torque profile may be stored in a database. In another embodiment, baseline torque profile data may be stored in the database. For example, the database may be stored in memory 154 of controller 150. As another example, the database may be stored at a site remote from rail vehicle 106. For example, historical data may be encapsulated in a message and transmitted with communications system 190. In this manner, a command center may monitor the health of the engine in real-time. For example, the command center may perform steps to diagnose the condition of the engine using the combustion torque profile data transmitted with communications system 190. For example, the command center may receive estimated combustion torque profile data of the engine from rail vehicle 106, frequency transform the torque profile data, and diagnose potential degradation of the engine. Alternatively, the command center may receive estimated combustion torque profile data of the engine from rail vehicle 106 and apply a template matching algorithm to the estimated data (perform a comparison to a baseline torque profile), and diagnose potential degradation of the engine. Further, the command center may schedule maintenance and deploy healthy locomotives and maintenance crews in a manner to optimize capital investment. Historical torque profile data may be further used to evaluate the health of the engine before and after engine service, engine modifications, and engine component change-outs.

In one embodiment, a potential fault may be reported to the locomotive operating crew via display 180. Once notified, the operator may adjust operation of rail vehicle 106 to reduce the potential of further degradation of the engine. In one embodiment, a message indicating a potential fault may be transmitted with communications system 190 to a command center. Further, the severity of the potential fault may be reported. For example, diagnosing a fault based on comparison of an estimated torque profile to a baseline torque profile may allow a fault to be detected earlier than when the fault is diagnosed with only average engine information (e.g., only speed information). Thus, the engine may continue to operate when a potential fault is diagnosed in the early stages of degradation. In contrast, it may be desirable to stop the engine or schedule prompt maintenance if a potential fault is diagnosed as severe. In one embodiment, the severity of a potential fault may be determined according to a difference between a threshold value and the magnitude of one or more components of the frequency content of the estimated combustion torque profile of the engine.

By analyzing the estimated combustion torque profile data, it may be possible to monitor and diagnose the engine during operation. Further, operation of an engine with a degraded component may be adjusted to potentially reduce additional degradation of the engine component and to potentially reduce the likelihood of additional engine failure and in-use failure. For example, the half-order component may be compared to a half-order threshold value. In one embodiment, if the magnitude of the half-order component is greater than the half-order threshold value, the potential fault may be a degraded cylinder. However, if the magnitude of the half-order component is not greater than the half-order threshold value, the potential fault may be a degraded turbocharger or a degraded crankcase evacuation system.

In one embodiment, the potential fault may be reported to the locomotive operating crew via display 180 and the operator may adjust operation of rail vehicle 106 to reduce the potential of further degradation. In one embodiment, a message diagnosing the potential fault may be transmitted with communications system 190 to a command center.

In one embodiment, an engine operating parameter may be adjusted to identify a degraded cylinder. For example, the degraded cylinder may be identified based on selective disabling of fuel injection to one or more cylinders of the engine. In one embodiment, fuel injection may be disabled for each cylinder of the plurality of cylinders in a sequence while one or more of the generator data and associated frequency content are monitored. For example, fuel injection to one cylinder may be disabled while the other cylinders operate normally. By disabling each cylinder in a sequence, the degraded cylinder may be identified. As another example, fuel injection to a group of cylinders may be disabled while the other cylinders operate normally. By cycling through different groups in a sequence, the degraded cylinder may be identified through a process of elimination.

In one example, the half-order frequency component of the torque profile data may be monitored for each disabled cylinder of a four stroke engine. The disabled cylinder may be a degraded cylinder when the half-order frequency component drops below a half-order threshold value while the cylinder is disabled. The disabled cylinder may be a healthy cylinder when the half-order frequency component remains above the half-order threshold value while the cylinder is disabled. In other words, the degraded cylinder may be the cylinder that contributes a higher amount of frequency content at the half-order frequency component than other cylinders. In one embodiment, the selective disabling diagnosis may be performed when the engine is operating at idle or lightly loaded.

In one embodiment, the degraded cylinder may be identified based on selectively varying fuel injection to one or more cylinders of the engine. For example, fuel may be selectively increased or decreased to each cylinder while the half-order frequency component of the estimated torque profile is monitored. Further, the signature, e.g. the frequency content, of each cylinder may be compared to historical data for the engine or to a healthy engine. For example, the diagnosis test may be performed on a healthy engine to generate a baseline signature. The baseline signature may then be compared to the frequency content while the engine is being diagnosed. In one embodiment, the degraded cylinder may be identified by varying engine fuel injection timing. For example, advance angle adjustments may be used to diagnose the degraded cylinder. For example, engine fuel injection timing may be retarded to potentially increase frequency content of the half-order frequency component.

It may be more desirable to switch off the engine than to have a degraded cylinder fail in a manner that may cause additional damage to the engine. In one embodiment, a threshold value may be determined that indicates continued operation of the engine may be undesirable because the potential fault is severe. For example, the potential fault may be judged as severe if a magnitude of the half-order frequency component exceeds a threshold value. The engine may be stopped if the severity of the potential fault exceeds the threshold value.

A request to schedule service may be sent, such as by a message sent via communications system 190, for example. Further, by sending the potential fault condition and the severity of the potential fault, down-time of rail vehicle 106 may be reduced. For example, service may be deferred on rail vehicle 106 when the potential fault is of low severity. Down-time may be further reduced by derating power of the engine, such as by adjusting an engine operating parameter based on the diagnosed condition. It may be determined if derating of the engine is enabled. For example, derating the power of the engine may reduce the magnitude of one or more components of the frequency content of the estimated combustion torque profile data.

An engine operating parameter may be adjusted, such as to reduce additional degradation of the degraded component, for example. In one embodiment, engine speed or power may be governed. In one embodiment, fuel injection may be reduced or disabled to the potentially degraded cylinder while continuing to operate the other cylinders. Thus, the engine may continue to operate and further degradation of the degraded cylinder may be reduced. In this manner, the engine may be adjusted to potentially reduce additional degradation of the engine component and to potentially reduce the likelihood of catastrophic engine failure and road failure.

In one embodiment, a test kit may be used for estimating a combustion torque profile of the engine and diagnosing a condition of the engine based on the estimated combustion torque profile. For example, a test kit may include a controller that is operable to communicate with one or more generator sensors and operable to sample the associated generator data. The controller may be further operable to transform signals from the one or more generator sensors into an electromagnetic torque profile of the generator. The controller may be further operable to estimate an inertial torque profile of the engine from engine speed as measured by the speed sensor, and modify the inertial torque profile based on the electromagnetic torque profile to estimate a combustion torque profile of the engine. The controller may be further operable to diagnose a condition of the engine based on the estimated combustion torque profile. The test kit may further include one or more sensors for sensing generator parameters (e.g., generator output voltage) and/or engine parameters (e.g., engine speed).

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be". The terms "generator" and "alternator" are used interchangeably herein (however, it is recognized that one term or the other may be more appropriate depending on the application). The terms "frequency content" and "harmonic content" are used interchangeably herein and can refer to fundamental frequency (and/or phase) components and associated harmonic frequency (and/or phase) components above and below the fundamental components. The term "instructions" as used herein with respect to a controller or processor may refer to computer executable instructions.

The embodiments described herein are examples of articles, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A vehicle system, comprising:
    an engine;
    a generator operatively connected to the engine;
    at least one sensor for measuring at least one electrical parameter associated with the generator during operation;
    a sensor for measuring the speed of a rotating shaft of the engine; and
    a controller including instructions configured to:
        sample and transform the at least one electrical parameter to an electromagnetic torque profile;
        sample and transform the rotating shaft speed to an inertial torque profile; and
        estimate a combustion torque profile of the engine from the electromagnetic torque profile and the inertial torque profile.

2. The vehicle system of claim 1, further comprising diagnosing a condition of the engine by comparing the estimated combustion torque profile of the engine to an expected engine torque profile.

3. The vehicle system of claim 2, wherein the controller is operable to report a degraded engine condition.

4. The vehicle system of claim 2, wherein the controller further includes instructions configured to adjust an engine operating parameter based on the diagnosed condition.

5. The vehicle system of claim 2, further comprising diagnosing an in-cylinder pressure profile of the engine by comparing the estimated combustion torque profile of the engine to an expected engine torque profile.

6. The vehicle system of claim 5, wherein the controller is operable to report a degraded in-cylinder pressure profile.

7. The vehicle system of claim 5, wherein the controller further includes instructions configured to adjust an engine operating parameter based on the in-cylinder pressure profile.

8. A test kit, comprising:
    a controller that is operable to determine a condition of a reciprocating engine operationally coupled to a generator based on comparing an estimated combustion torque profile of the engine to an expected engine torque profile; and at least one sensor to sense at least one electromagnetic parameter associated with the generator, wherein the controller is operable to communicate with the at least one sensor to sample the at least one electromagnetic parameter over time, and wherein the controller is further operable to estimate an electromagnetic torque profile from the at least one electromagnetic parameter.

9. The test kit of claim 8, further comprising a sensor to sense a rotating shaft speed of the reciprocating engine, wherein the controller is operable to communicate with the sensor to sample the shaft speed over time, and wherein the controller is further operable to estimate an inertial torque profile from the shaft speed.

10. The test kit of claim 9, wherein the controller is further operable to determine the estimated combustion torque profile of the engine from the electromagnetic torque profile and the inertial torque profile.

* * * * *